Jan. 29, 1957 R. W. ALLEN 2,779,636
VEHICLE WHEEL SUSPENSION
Filed Jan. 2, 1952 3 Sheets-Sheet 1
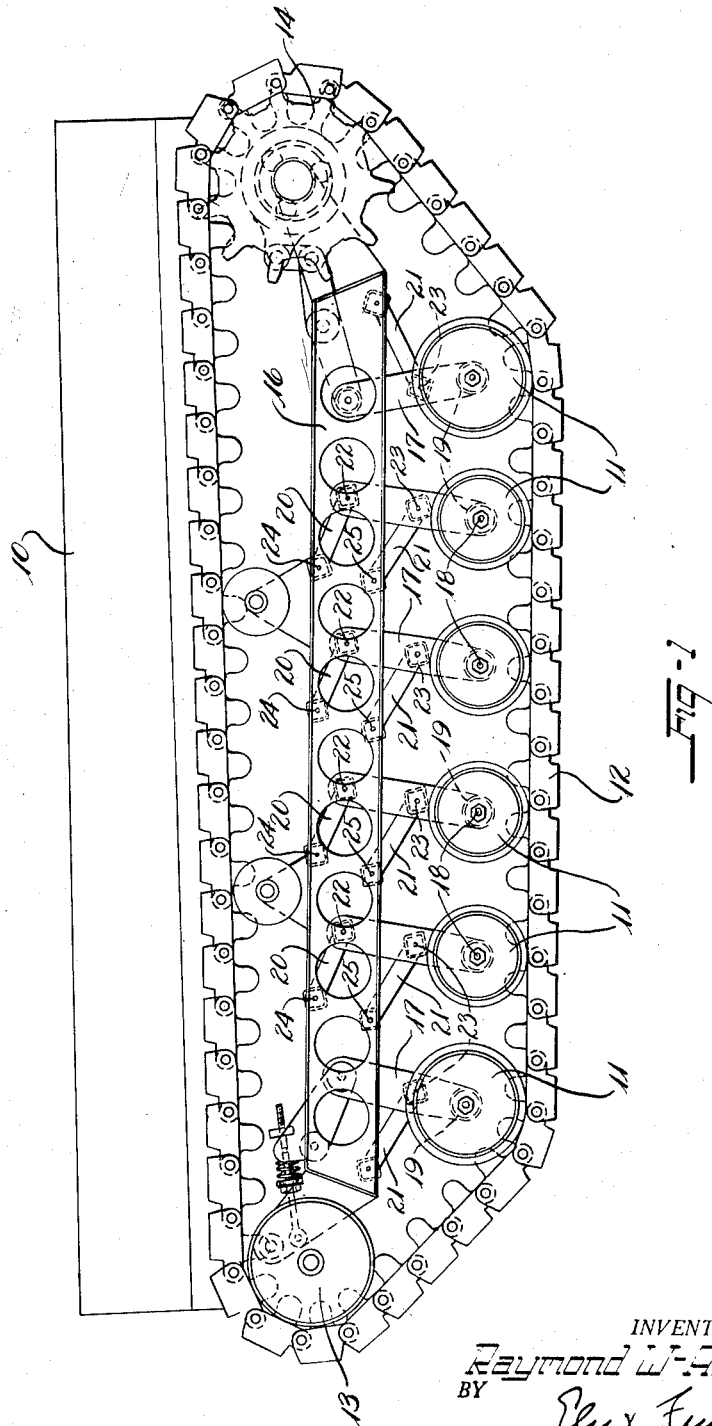
INVENTOR.
Raymond W. Allen
BY
Ely & Frye
Attys.

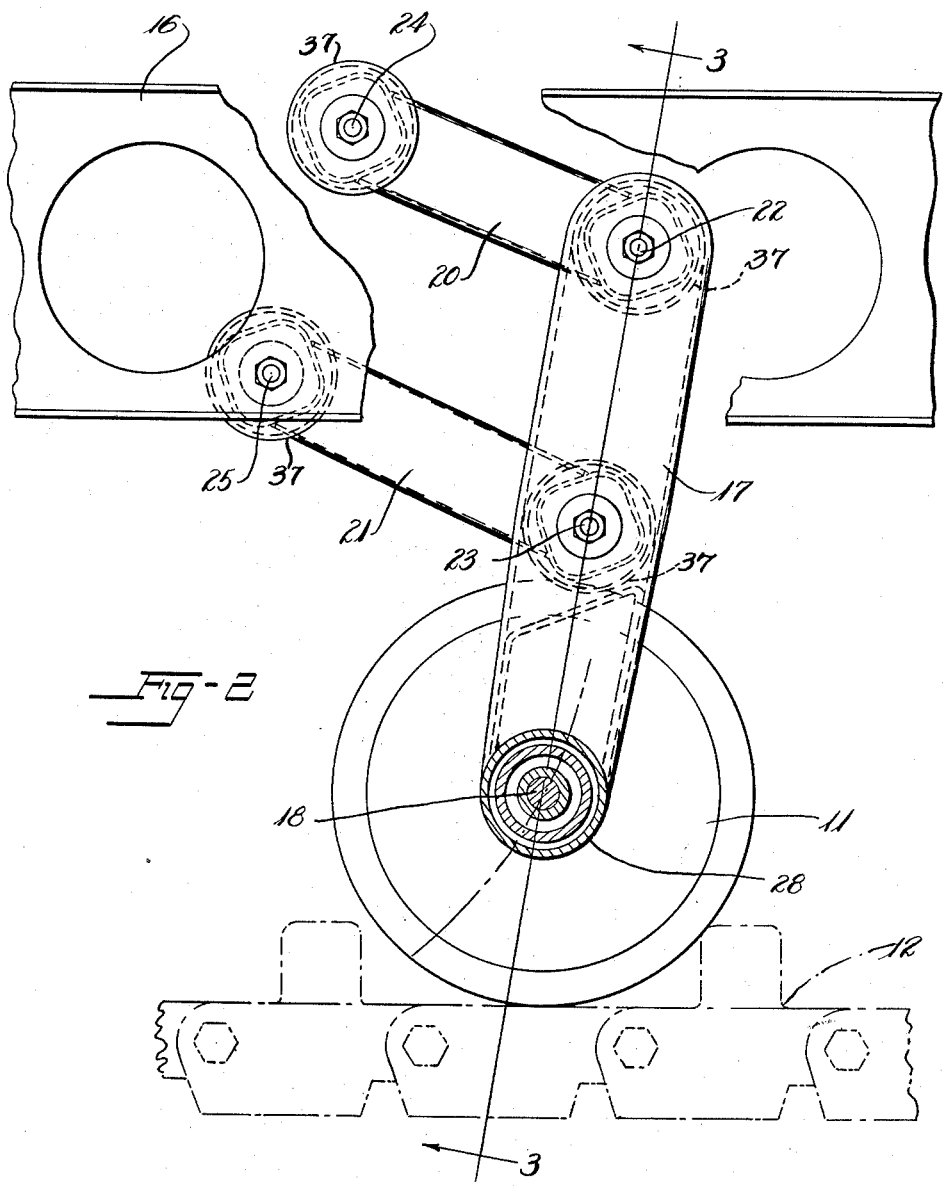

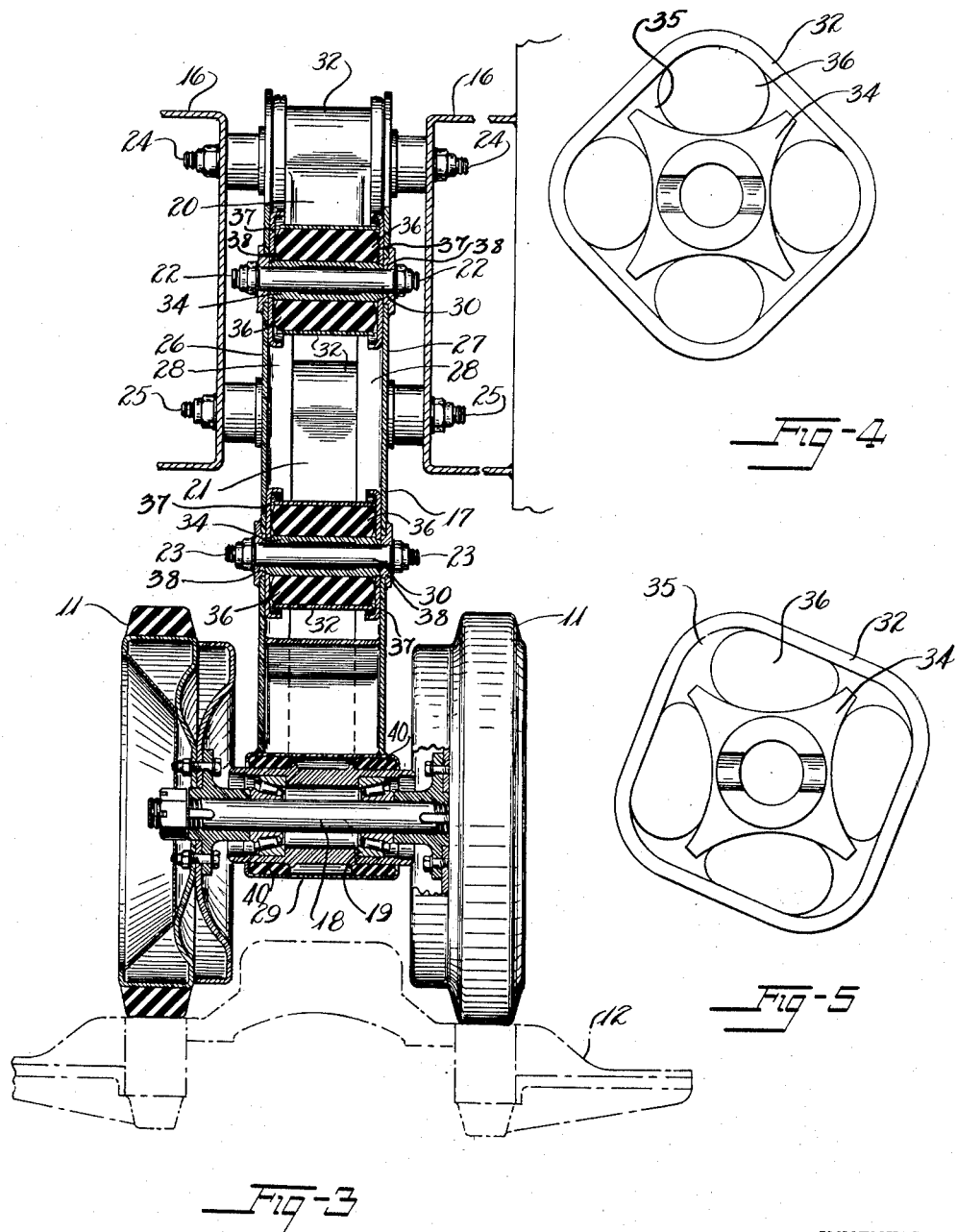

United States Patent Office 2,779,636
Patented Jan. 29, 1957

2,779,636

VEHICLE WHEEL SUSPENSION

Raymond W. Allen, Akron, Ohio, assignor to The Firestone Tire & Rubber Company, Akron, Ohio, a corporation of Ohio Application January 2, 1952, Serial No. 264,374

6 Claims. (Cl. 305—9)

This invention relates to an improved wheel suspension and mounting and more particularly to an improved wheel suspension and mounting for the bogie wheels of track-laying vehicles.

Heretofore, track-laying vehicles have had their bogie wheels mounted in pairs on swingable arms secured to the body of the vehicle at points appreciably in front of the respective bogie wheels. With such a suspension, the bogie wheels will respond to rough ground by swinging in arcuate paths which involve an appreciable component of upward movement and a limited amount of rearward movement, this rearward movement being termed the "retreat" of the wheels. Both components of movement are necessary if the vehicle is to have a satisfactory ride.

Such wheel suspensions have, in many cases, proved to be unsatisfactory for a number of reasons. If the vehicle has substantial ground clearance, the pivot points of the swingable arms cannot be positioned in front of the respective wheels but must be moved to a position almost directly above the bogie wheels. With its pivot point so relocated, a bogie wheel will respond to a bump by swinging in an arc having an excessive amount of retreat in relation to its upward movement, and consequently the bogie wheel will collide with the next wheel to the rear before a sufficient upward movement to absorb shocks will be obtained. A further objection to the prior bogie wheel suspensions is that the load is carried by a single bearing at the pivot of the supporting arm. This bearing which usually takes the form of a resilient bushing frictionally engages one bearing surface and is secured to another bearing surface, carrying the loads imposed thereon by undergoing torsion. The bushings must be relatively massive, and are difficult to fit into the limited space which is available. Another objection is that at low temperatures, such as are encountered in the field, the bushings will freeze and lose their frictional properties, and their ability to carry the loads.

The problems of bogie wheel suspension outlined above are successfully met by the present invention in which the wheels are supported by a crank arrangement to provide the desired amounts of retreat and vertical yielding to the wheels of a vehicle having high ground clearance. In addition the arrangement provides a plurality of bearing points for each pair of wheels so that the static load of the vehicle and the shock loads imparted to the wheels are distributed over several bearing points instead of being concentrated at one point as in the prior suspensions. With this type of construction more effective shock absorbing bearing constructions are provided at each of the bearing points, and means which permit a limited laterall movement of the bogie wheels to adjust for tilting of the tracks are also provided.

It is a general object of the invention, therefore, to provide a wheel suspension and mounting which has the advantages of the invention as outlined above while avoiding the disadvantages of the prior art.

A further object is to provide a wheel suspension in which the wheel can be supported from a point above and almost over the axle of the wheel while enabling the wheel to respond to shocks by movements involving substantial upward vertical and rearward lateral components.

Another object is to provide a wheel suspension which is compact, strong, easy to install and maintain and which has a long service life.

Another object is to provide a suspension for the bogie wheels of a track-laying vehicle which enables the wheels to yield to rough ground without adjacent wheels interfering with one another.

A further object is to provide a wheel suspension having a plurality of bearing and shock absorbing points in order to distribute the static and dynamic loads to which the wheels are subjected.

Another object is to provide a modified crank suspension of the wheels of a vehicle which distributes the load over a plurality of bearing pivot points, each of which undergoes torsion differing in degree and extent from the others whereby to reduce the tendency for harmonics to build up in the suspension and thus to minimize vibration.

Another object is to provide a bogie wheel mounting for a track-laying vehicle providing a limited amount of lateral play to permit the wheels to accommodate lateral tilting of the track.

Further objects and advantages will become more apparent from the following description of a preferred form of the invention, reference being had to the accompanying drawings in which:

Figure 1 is a side elevation of a track-laying vehicle showing a form of bogie wheel suspension embodying the invention;

Figure 2 is a partly fragmentary side elevation showing the bogie wheel suspension of Figure 1 on an enlarged scale, the bogie wheels being shown in their normal position, and the dotted arcuate line showing the path in which the wheels swing to take up shocks;

Figure 3 is an end elevation taken along lines 3—3 of Figure 2;

Figure 4 is a sectional view on an enlarged scale of the pivotal bearing constructions involved in the bogie wheel suspension of Figures 2 and 3, the bearing being shown in the unstressed state corresponding to the normal position of the bogie wheel; and Figure 5 is a view corresponding to Figure 4 showing the bearing in a stressed state taking up the shocks imparted by movement of the bogie wheels.

The invention is illustrated in connection with a track-laying vehicle of the type popularly called the "weasel." The vehicle is intended to carry men and equipment at high speeds over rough terrain and is intended to operate under wide extremes of temperature. Such service requires a rugged, serviceable bogie wheel suspension capable of absorbing severe shocks without the build up of undue vibrations.

As shown in Figure 1, the vehicle comprises a body 10 supported by a plurality of bogie wheels 11, arranged in pairs, which ride upon a pair of endless tracks 12 positioned respectively on each side of the vehicles. The front of the vehicle is shown to the left of Figure 1, the tracks passing over the front idling sprockets 13 and being driven in a counterclock-wise direction by the rear driving sprockets 14.

The bogie wheels 11 are pivotally suspended from a pair of longitudinal channels 16, which are secured to each side of the hull of the vehicle, by a double crank arm arrangement involving two fixed pivots and two movable pivots. Thus as shown in Figure 2, each pair of bogie wheels is mounted on a member 17 which normally extends upwardly and rearwardly at a slight angle from the vertical, the bogie wheels being journaled on an axle 18 by the bearing construction indicated generally at 19. The member 17 is secured to the channel 16 by a pair of substantially parallel arms 20 and 21 which are pivotally secured to the member 17 at the bearing points 22 and 23, respectively, and which are pivotally supported by the channel at the bearing points 24 and 25, respectively. With this double crank arrangement, the bogie wheels will respond to an irregularity in the ground by swinging through the arc indicated by the dotted line in Figure 2, which it will be seen involves a substantial vertical component of movement while retaining the desired amount of "retreat."

The details of construction may vary widely within the scope of the invention. In the present example, the main support member 17 comprises two members 26 and 27 which are flanged as at 28 in order to obtain the required stiffness and strength, and the members 26 and 27 are welded at their lower ends to a journal housing 29 which supports the bearings 19 of the bogie wheels. The members 26 and 27 are spaced apart by the spacer members 30 which extend between the members as shown and which also form parts of the bearing construction at bearing points 22 and 23. The arms 20 and 21 preferably are of welded tubular construction and are provided at each end with tubular bearing housings 32.

In the prior type of suspension, in which each pair of bogie wheels was mounted on a single pivotal member, the load was necessarily concentrated on a single bearing, which usually took the form of a rubber bushing vulcanized to a fixed pivot pin and having frictional engagement with an external sleeve in the manner described in the U. S. Patent No. 2,049,024, issued July 28, 1936, to Isaac W. Robertson. In such a bearing, movement of the bogie wheels resulted in and were resisted by the build up of torsional stresses in the rubber bushing. However, in order for the single bearing of this and other types to have sufficient bearing capacity, it had to be excessively bulky and massive. Moreover, such bearings tend to creep under load and in low temperatures tend to lose their functional qualities, permitting the bogie wheel mountings to pivot without effective shock absorbing opposition. In addition, with a single bearing, there is a tendency for severe vibrations to arise as a result of harmonics building up in the suspension.

In contrast, the bogie wheel suspension described herein has the advantage of dividing and distributing the total bearing load over four pivot points. With such an arrangement, the loads at any one bearing point are greatly reduced, and the bearings will more effectively absorb shocks and will have increased effectiveness and longer service life. In addition, the arms 20 and 21 are preferably of slightly different lengths, with arm 20 being somewhat longer so that the arcuate movement which each bearing undergoes at the different pivot points varies in extent. By this means, vibrations are effectively dampened and the build up of harmonics is materially reduced, if not eliminated.

The particular bearings employed at the pivot points have the characteristics required by the difficult service to which such a vehicle is subjected. Since the bearings are identical, only the bearing at pivot point 22 will be described. That bearing, which is shown in Figure 3 in longitudinal section and in Figures 4 and 5 in transverse section, comprises a substantially square tubular outer housing member 32 and the central member 30, which has secured thereto a substantially square, slightly fluted sleeve 34 normally disposed in relation to the tubular member 32 in the manner shown in Figure 4 so as to define the corner spaces 35. A rubber member 36 which is normally cylindrical in shape is inserted into each of the corner spaces 35 so as to maintain the housing member 32 and central member 34 properly spaced from each other and to cushion the relative rotational movements of the two members. The rubber cylinders are slightly compressed in the initial unloaded position of the bearing, see Figure 4. In the present example the stem member 34 is considered as fixed, with the housing member 32 rotating with respect to the stem to take up the movements of the bogie wheels. When this relative rotation takes place, the fluted portions of the stem move closer to the flat side walls of the housing so that the spaces between the parts become increasingly wedge-shaped and smaller in volume. As this movement takes place, the rubber cylinders 36 roll between the confining surfaces into the wedge-shaped spaces undergoing increasingly greater compression. As each increment of rotation takes place the build-up of compressional stresses in the rubber cylinders increasingly resists further rotation. The result is that the movement of the arms, and hence of the bogie wheels is effectively cushioned.

The bearing just described depends not upon the frictional engagement of a rubber member with an adjoining metal part as in the Robertson bushings, but depends almost entirely upon the cushioning action of rubber in compression for its effectiveness. The functioning of the bearing is thus relatively independent of temperature, for rubber will function in compression at low temperatures almost as well as it will at normal temperatures.

Normally the bearings have only limited thrust loads imposed upon them, and these can usually be taken care of by frictional engagement of the parts. However, it is desirable to confine the rubber members by end plates 37 which are secured to the stems as at 38 and which prevent the rubber members from squeezing axially out of the housing. Confining the rubber in such a manner improves the shock absorbing characteristics of the bearing.

It will be noted from Figure 2 that all four of the tubular housings 32 are normally aligned in substantially the same positions. If desired, however, one or more of the bearings may be preloaded in order to prevent the building up of harmonics, although generally the difference in length between the arms 20 and 21 is sufficient to take care of this difficulty.

Another feature of the invention enables the suspension to compensate for slight amounts of angular tilting of the tracks. This is accomplished by the construction shown in Figure 3 in which the bogie wheel axle and bearing is shown to be supported by two annular rubber cushions 40 which are interposed between the bearing 19 and the housing 29 at the end of member 17. The annular cushions 40, it will be noticed, are flat so as to present a substantial bearing area and are held in position by flanges on the bearing and the housing so that there is no tendency for them to shift position. Relative tilting of member 17 and the axle 18 takes place by compression of the cushions.

While a preferred form of the invention has been described, various modifications and improvements will occur to those skilled in the art, all within the scope of the invention, the essential features of which are summarized in the appended claims.

What is claimed is:

1. In a track laying vehicle in which the body of the vehicle is supported by a plurality of bogie wheels rolling on two endless tracks, a bogie wheel suspension comprising a pair of substantially parallel arms pivotally supported at respective corresponding ends from the body of said vehicle, a main support member pivotally secured to the other end of said parallel arms, said arms each having a housing member on the swinging end thereof, the main support member provided with angularly shaped sleeves adapted to respectively fit into each of said housings, and cylindrical resilient members separating said sleeves from the walls of said housing members, said cylindrical members under load at all positions of said support.

2. In a track laying vehicle in which the body of the vehicle is supported by a plurality of bogie wheels rolling on two endless tracks, a bogie wheel suspension comprising a pair of substantially parallel arms pivotally supported at respective corresponding ends from the body of said vehicle, one arm nearer a wheel than the other, a main support member pivotally secured to the other end of said parallel arms, said arms each having a housing member on the swinging end thereof, the main support member provided with angularly shaped sleeves adapted to respectively fit into each of said housings, and resilient members separating said sleeves from the walls of said housing members, said resilient members under load at all positions of said support.

3. In a track laying vehicle in which the body of the vehicle is supported by a plurality of bogie wheels rolling on two endless tracks, a bogie wheel suspension comprising a pair of substantially parallel arms pivotally supported at respective corresponding ends from the body of said vehicle, one arm nearer a wheel than the other, a main support member pivotally secured to the other end of said parallel arms, said arms each having a housing member on the swinging end thereof, the main support member provided with angularly shaped sleeves adapted to respectively fit into each of said housings, and resilient members separating said sleeves from the walls of said housing members, said resilient members under load at all positions of said support, one said resilient member under greater load than the other at all positions of the support.

4. In a track laying vehicle in which the body of the vehicle is supported by a plurality of bogie wheels rolling on two endless tracks, a bogie wheel suspension comprising a pair of substantially parallel arms pivotally supported at respective corresponding ends from the body of said vehicle, one arm nearer a wheel and shorter than the other, a main support member pivotally secured to the other end of said parallel arms, said arms each having a housing member on the swinging end thereof, the main support member provided with angularly shaped sleeves adapted to respectively fit into each of said housing members, and resilient members separating said sleeves from the walls of said housing members, said resilient members under load at all positions of said support.

5. In a track laying vehicle in which the body of the vehicle is supported by a plurality of bogie wheels rolling on two endless tracks, a bogie wheel suspension comprising a pair of substantially parallel arms pivotally supported at respective corresponding ends from the body of said vehicle, one arm nearer a wheel than the other, a main support member pivotally secured to the other end of said parallel arms, each of said arms having a housing member on the swinging end thereof, said support member mounting a third housing member, said support member also provided with two angularly shaped sleeves adapted to fit respectively into said housing members on said arms, resilient members separating said sleeves from the walls of said housing members and under load at all positions of the support member, a bogie axle assembly including an outer bearing sleeve pivotally mounted in said third housing member on said support member, and rubber cushions separating said outer bearing sleeve from the walls of said housing member.

6. In a track laying vehicle in which the body of the vehicle is supported by a plurality of bogie wheels rolling on two endless tracks, a bogie wheel suspension comprising a pair of substantially parallel arms pivotally supported at respective corresponding ends from the body of said vehicle, one arm nearer a wheel than the other, a main support member pivotally secured to the other ends of said parallel arms, each of said arms having a housing member on the swinging end thereof, said support member mounting a third housing member and two angularly shaped sleeves adapted to fit into said housing members on said arms respectively, resilient members separating said sleeves from the walls of said housing members, said resilient members under load at all positions of the support, a bogie axle assembly including an outer bearing sleeve pivotally mounted in said third housing on said support member, said sleeve having flanges on the outer face, and cushion members abutting said flanges and separating said third sleeve from the walls of said housing.

References Cited in the file of this patent

UNITED STATES PATENTS

| 1,547,043 | Kegresse | July 21, 1925 |
| 1,547,586 | Kegresse | July 28, 1925 |
| 2,308,331 | Heaslet | Jan. 12, 1943 |
| 2,445,723 | Brown | July 20, 1948 |